June 20, 1939.  W. W. HAASE  2,163,174
POWER ATTACHMENT FOR BURIAL DEVICES
Original Filed Oct. 10, 1936   2 Sheets-Sheet 2
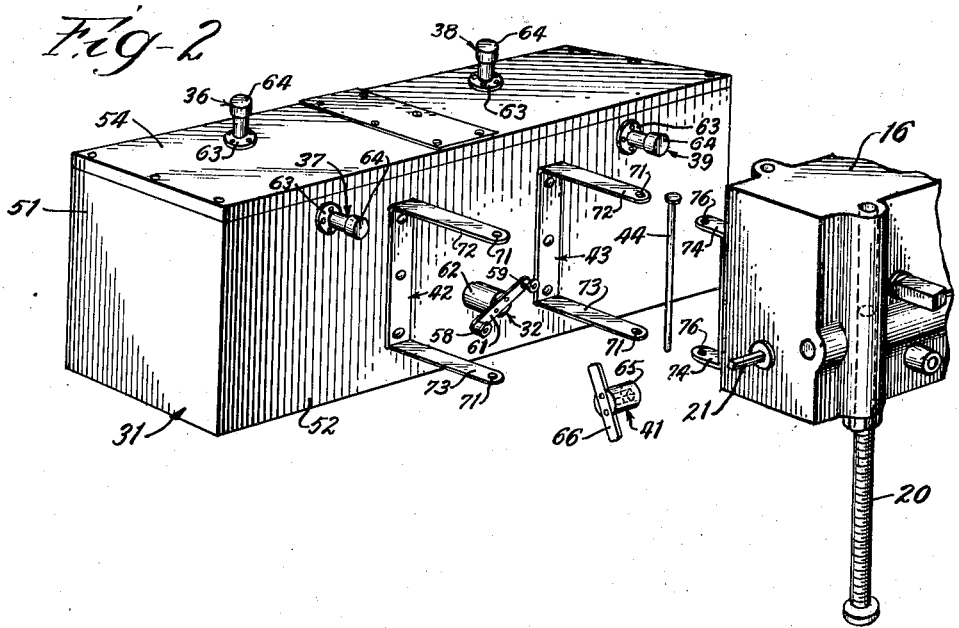
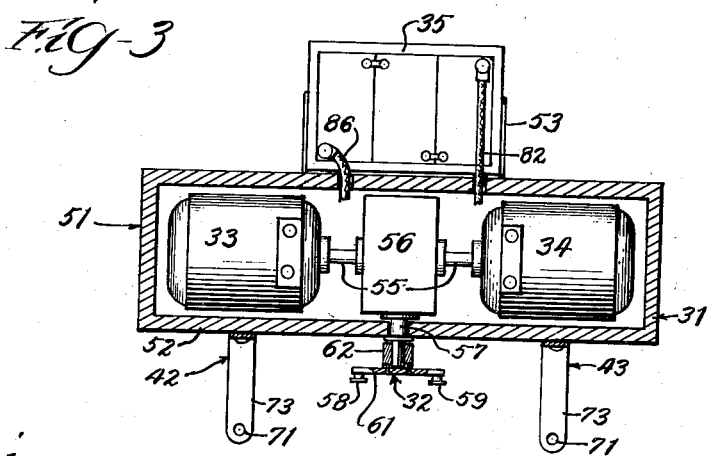
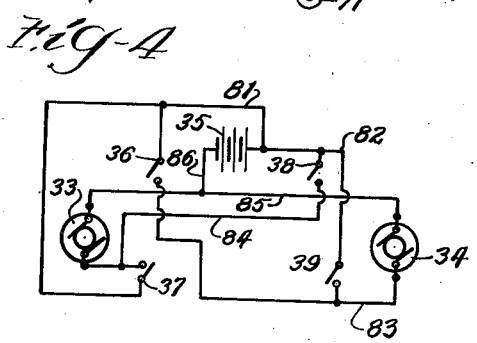
Inventor
Wilbert W. Haase.
By: Raymond V. Schmoor
Atty.

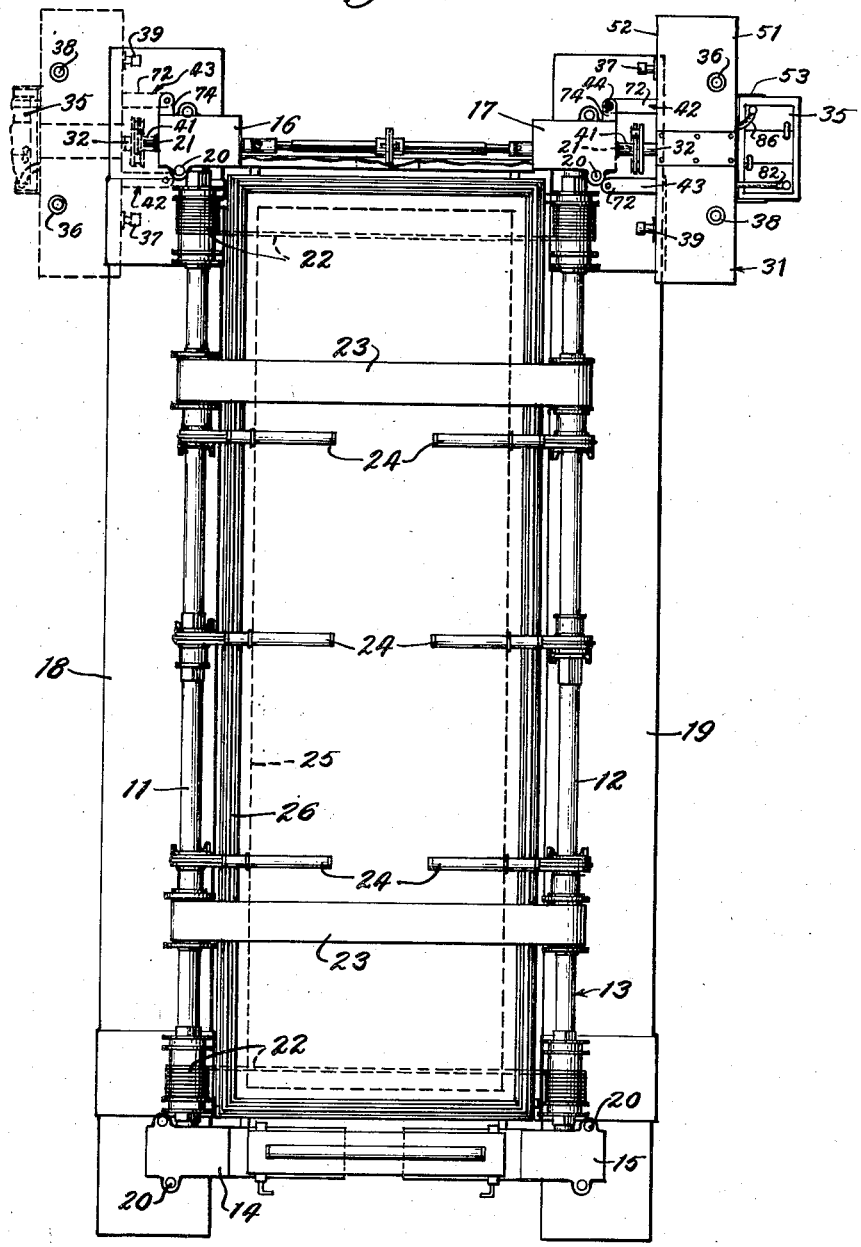

Patented June 20, 1939

2,163,174

UNITED STATES PATENT OFFICE 2,163,174

POWER ATTACHMENT FOR BURIAL DEVICES

Wilbert W. Haase, Forest Park, Ill., assignor to Wilbert W. Haase Co., Forest Park, Ill., a corporation of Illinois Application October 10, 1936, Serial No. 105,062
Renewed January 3, 1939

11 Claims. (Cl. 27—32)

This invention relates to a power attachment for burial devices and has for an object the provision of a unitary motive device which may be readily transported and attached for operating burial devices and embodies certain improvements on the Power attachment described in my earlier application Serial Number 75,952 filed April 23, 1936 (and in a divisional application thereof Serial No. 214,462 filed June 18, 1938).

Another important object is to provide such a device which may be attached to a burial device in either one of two or more positions to that obstructions may be avoided and to provide control means therefor which may be conveniently engaged to cause operation of the burial device when attached thereto.

Other objects such as the connecting means, and the economy and efficiency of construction and operation will be apparent as the invention is better understood from the following description, which, taken in connection with the accompanying drawings discloses a preferred embodiment thereof.

Referring to the drawings

Figure 1 is a plan view of a burial device having a power attachment embodying my invention attached thereto.

Figure 2 is an exploded perspective view illustrating construction and certain features of the power attachment.

Figure 3 is a plan view of the power attachment broken away in part to show details of construction, and;

Figure 4 is a diagrammatic view illustrating the electrical connections.

To illustrate the invention I have shown a burial device of the type shown and described in my copending application Serial Number 105,061, executed and filed of even date herewith though obviously the power attachment may be arranged for attachment to any similar device.

The burial device illustrated includes rotatable lowering elements or shafts 11 and 12, operably mounted in and forming a part of a support frame 13, which includes corner supports 14, 15, 16, and 17, by means of which the frame 13 is supported over a grave excavation on planks 18 and 19, by suitable legs 20, and means for operably connecting the rotatable shafts 11 and 12 including crank stems 21, one of which extends from each one of the pedestals 16 and 17. Flexible elements 22 and 23, and temporary support devices 24, are connected to the rotatable shafts 11 and 12 for supporting and lowering a casket 25 (indicated by dotted lines) and a burial vault 26, as described in my above mentioned copending application.

The power attachment includes a body or case 31, from which a drive device 32 extends, motor means including motors 33 and 34, arranged on or in the body 31, an energizing or battery element 35, control switches 36, 37, 38 and 39, and connecting devices including a drive key 41, mounting brackets 42 and 43, and a pivot pin 44.

The body or case 31 may be any suitable body arranged to support the power devices or motors 33 and 34 and battery 35 and to which the brackets 42 and 43 may be attached. In the present embodiment I have shown a case 51, having a front wall 52 to which the brackets 42 and 43 may be attached and having a rearwardly extending shelf 53 suitably attached thereto for supporting the battery 35. A cover of the case 51 encloses the motor devices.

The motor means illustrated includes the motors 33 and 34 which may be of any commercial design, mounted in opposition in the case 51 and connected to opposite ends of a driven shaft 55 of a commercial speed reducer 56, a drive shaft 57 of which extends through the front wall 52 of the case 31 to receive the drive device 32, (Fig. 3). The motors 33 and 34 are both right hand motors so that the direction of rotation of the drive shaft 57 and the drive device 32 may be determined by operation of the corresponding motor.

The drive device 32 may be any suitable coupling device and in the present instance I have shown flanged driving pins 58 and 59, extending from a common face and arranged adjacent the ends of a bar 61, which is suitably secured to a centrally disposed hub 62, having an angular bore therein for receiving the angular or square end of the shaft 57.

The battery 35 may be any suitable commercial storage battery of suitable capacity to operate the motors 33 and 34.

The switches 36, 37, 38 and 39, may be any suitable switch devices capable of transmitting the required power and in the present embodiment I have shown switches of a type in common use on automobiles for starting switches including a flanged base 63 and a yielding stem 64 which may be pressed to establish contact or to close the circuit in which the switch is connected.

The drive key 41 may be any suitable device having a hub 65, with an angular bore therein and adapted to fit onto the crank stem 21 of the corner supports 16 and 17, and having a connecting element such as a bar 66, suitably secured thereto and arranged to engage the driving pins 58 and 59, of the drive device 32.

To provide a means for attaching the power attachment to the burial device in either right or left-hand relationship or to the corner supports 16 or 17 thereof I have shown the brackets 42 and 43, which may be substantially U shaped and suitably secured to the front wall 52 of the case 31, having apertures 71 adjacent the ends of arms 72 and 73, thereof which are preferably spaced relatively wide apart.

Means providing a similar bracket having laterally extending and spaced arms 74, is formed on or attached to the corner supports 16 and 17. The arms 74 are apertured as at 76 to receive the pivot pin 44, which may be any suitable pin device, and are spaced apart substantially equal to the spacing of the arms 72 and 73. The relative length of the arms 72 and 74 and likewise the arms 73 and 74 is such that when they are connected by means of the pin 44 and positioned as shown (Fig. 1) the drive device 32 and the drive key 41 mounted on the crank stem 21 will be substantially in coaxial relationship and operably connected.

As above mentioned either the arms 72 and 73 of the bracket 42 may be connected to the bracket arms 74 of the corner support 17 (as shown by solid lines and to the right, Fig. 1), or the arms 72 and 73 of the bracket 43 may be connected to the arms 74 of the corner support 16, as indicated by dotted lines and to the left (Fig. 1). To make the connection it is only necessary to bring the proper arms 72 and 73 into alignment with the arms 74 of the proper pedestal and swing the power attachment about the pivot pin 44 to couple the drive elements 32 and 41 in operative relationship.

Proper electrical connections facilitating control of the motors 33 and 34 by means of the switches 36, 37, 38 and 39, are illustrated in diagram (Fig. 4). These switches are all connected through wires 81 and 82, to one side of the battery 35 and are connected to the motors to effect operation thereof in accordance with the location of the switches on the case 51 or so that the switches 36 and 38 will operate the motors to move a vault or casket either up or down and the switches 37 and 39 will operate the proper motors for moving the vault or casket in the opposite direction. This is accomplished by connecting the switch 36, which is located on the cover 54 of the case 51, to actuate the motor 34 through a wire 83 and the switch 39 which is located adjacent the opposite end on the front wall 52 of the case 51 is connected through the wire 83 to the same motor because the operation of the burial device is naturally reversed when the power attachment is shifted from right relationship or from the position shown in solid lines to the position shown in dotted lines (Fig. 1). Similarly the switches 37 and 38 are connected to drive the motor 33 by means of a wire 84 and are correspondingly located on the case 51. Wires 85 and 86, connect the motors 33 and 34 with the battery 35 to complete the circuits.

The location of the switches 36 and 38 on the cover 54 of the case 51 may correspond with an upward movement of the vault or of the casket and similarly the location of the switches 37 and 39 being lower may correspond with a lowering movement thereof.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The combination with a burial device, comprising rotatable lowering elements, a frame for supporting said lowering elements, and means including a crank stem mechanically connected to actuate said lowering elements, of a drive key arranged for attachment to said crank stem, and a motorized power unit including a driving element actuated by the power unit and adapted to interlockingly engage said drive key when arranged adjacent and substantially in alignment therewith for actuating said rotatable lowering elements.

2. The combination with a burial device, comprising rotatable lowering elements, a frame for supporting said lowering elements, and means including a crank stem mechanically connected to actuate said lowering elements, of a drive key arranged for attachment to said crank stem, and a motorized power unit adapted for attachment to the frame and carrying a driving element adapted to engage said drive key for actuating said rotatable lowering elements.

3. The combination with a burial device, comprising rotatable lowering elements, a frame for supporting said lowering elements including corner support devices, and means including crank stems extending from said corner supports and operably connected to actuate said lowering elements, of a drive key arranged for attachment to one of said crank stems, means including a driving element adapted to engage said drive key for actuating said rotatable lowering elements, and mounting means whereby the driving element may be attached to one of the pedestals and arranged to actuate the rotatable elements.

4. The combination with a burial device of the character described, of a power attachment for actuating the burial device including power means, and a reversible mounting means therefor whereby the power attachment may be connected for actuating the burial device in either left or right hand relationship and to avoid obstructions.

5. The combination with a burial device of the character described, of a reversible power attachment for actuating the burial device including power means, and mounting means therefor constructed and arranged for pivotal attachment to the burial device in one or the other of a plurality of positions whereby the power attachment may be connected to actuate the burial device in accordance with conditions.

6. The combination with a burial device, comprising rotatable lowering elements and support means therefor, and a power unit for actuating said rotatable lowering elements including drive means extending therefrom, of drive devices connected for operating said lowering elements and adapted to be interlockingly engaged by the drive means of said power unit whereby the power unit is connected to actuate said rotatable elements.

7. The combination with a burial device, comprising rotatable lowering elements, a frame for supporting said lowering elements including corner support devices, and means including crank stems extending from said corner supports and operably connected to actuate said lowering elements, of a drive key arranged for attachment to one of said crank stems, means including a driving element adapted to engage said drive key for actuating said rotatable lowering elements, and mounting means whereby the driving element may be attached to one of the pedestals and arranged to actuate the rotatable elements, said mounting means including a bracket mounted on a corner support, and a cooperating bracket attached to the power unit.

8. The combination with a burial device, comprising rotatable lowering elements, a frame for supporting said lowering elements including corner support devices, and means including crank stems extending from said corner supports and operably connected to actuate said lowering elements, of a drive key arranged for attachment to one of said crank stems, means including a driving element adapted to engage said drive key for actuating said rotatable lowering elements, and mounting means whereby the driving element may be attached to one of the pedestals and arranged to actuate the rotatable elements, said mounting means including brackets mounted on more than one of the corner supports, and a plurality of brackets attached to the power unit and each one thereof being adapted for pivotal connection with one of the corner support brackets.

9. A power unit of the character described, comprising a portable housing containing power apparatus, support means attached to said housing whereby the power unit may be supported on a burial device, coupling means for connecting the power apparatus carried by the portable housing with a rotatable element of and for actuating the burial apparatus, and control means mounted on said housing and individualized to directional action of said power apparatus whereby the directional action of the burial device may be selectively controlled.

10. The combination with a burial device comprising rotatable lowering elements, a frame for supporting said lowering elements, and means including a crank stem mechanically connected to actuate said lowering elements, of a portable housing containing power apparatus and a drive shaft, mounting means arranged for supporting said portable housing on the frame of said burial device adjacent the crank stem, and coupling means adapted to operatively couple the crank stem with the drive shaft of the power apparatus while the housing thereof is supported on said frame.

11. The combination with a burial device comprising rotatable lowering elements, a frame for supporting said lowering elements, and means including a crank stem mechanically connected to actuate said lowering elements, of a portable housing containing power apparatus and a drive shaft, mounting means arranged for supporting said portable housing on the frame of said burial device adjacent the crank stem, and coupling means adapted to operatively couple the crank stem with the drive shaft of the power apparatus while the housing thereof is supported on said frame, said coupling means comprising separable parts one of which is attached to the crank stem and another of which is attached to the drive shaft.

WILBERT W. HAASE.